April 27, 1965     H. P. BROWER ETAL     3,181,073
TUNABLE PHASE DETECTOR

Filed Oct. 8, 1962     2 Sheets-Sheet 1

INVENTORS
HARLEY P. BROWER
MARVIN E. FRERKING
BY Moody and Harris
ATTORNEYS

United States Patent Office 3,181,073
Patented Apr. 27, 1965

3,181,073
TUNABLE PHASE DETECTOR
Harley P. Brower and Marvin E. Frerking, Cedar Rapids, Iowa, assignors to Collins Radio Company, a corporation of Iowa
Filed Oct. 8, 1962, Ser. No. 229,021
6 Claims. (Cl. 328—134)

This invention relates to a phase detector and more particularly to a bridge type phase detector capable of providing high resolution of phase detection over a broad range of frequencies.

The use of a bridge type phase detector, wherein a received signal is compared with a reference signal and an output produced proportional to the frequency difference therebetween, is well known in the art. Such a phase detector is shown, for example, in United States Patent No. 2,905,818. Phase detectors of this type have, however, proven unsuitable for utilization over a broad range of frequencies (1 megacycle to 110 megacycles, for example) due, at least in part, to transformer deficiencies at higher frequencies.

When the range of frequencies to be handled by a phase detector is broadened, it becomes more difficult to provide adequate signal magnitude and reasonable signal balance within the detector over the entire range. These deficiencies are unsatisfactory, in many cases, since, as is well known in the art, resolution of phase detection decreases with lower voltages. Phase detectors now known or utilized, however, are either incapable of handling higher voltages necessary for high resolution or are incapable of being tuned over a broad range of frequencies and are therefore limited in use.

It is an object of this invention to provide a phase detector that is capable of providing high resolution of phase detection over a broad range of frequencies.

More particularly, it is an object of this invention to provide a phase detector having tuned circuit means whereby the phase detector is capable of being tuned over a frequency range from 1 megacycle to 110 megacycles and yet provide high resolution of phase detection at any frequency within said covered range.

It is yet another object of this invention to provide a bridge type phase detector having a plurality of tuned circuit means each of which covers a portion of a broad range of frequencies whereby high resolution can be maintained and whereby a broad frequency range can nevertheless be covered.

With these and other objects in view which will become apparent to one skilled in the art as the description proceeds, this invention resides in the novel construction, combination and arrangement of parts substantially as hereinafter described and more particularly defined by the appended claims, it being understood that such changes in the precise embodiment of the herein disclosed invention may be included as come within the scope of the claims.

The accompanying drawings illustrate one complete example of the embodiment of the invention constructed according to the best mode so far devised for the practical application of the principles thereof, and in which:

FIGURE 3 is an illustration of the required positioning of FIGURES 1 and 2 whereby the entire schematic diagram of the phase detector of this invention is presented.

Figure 1:
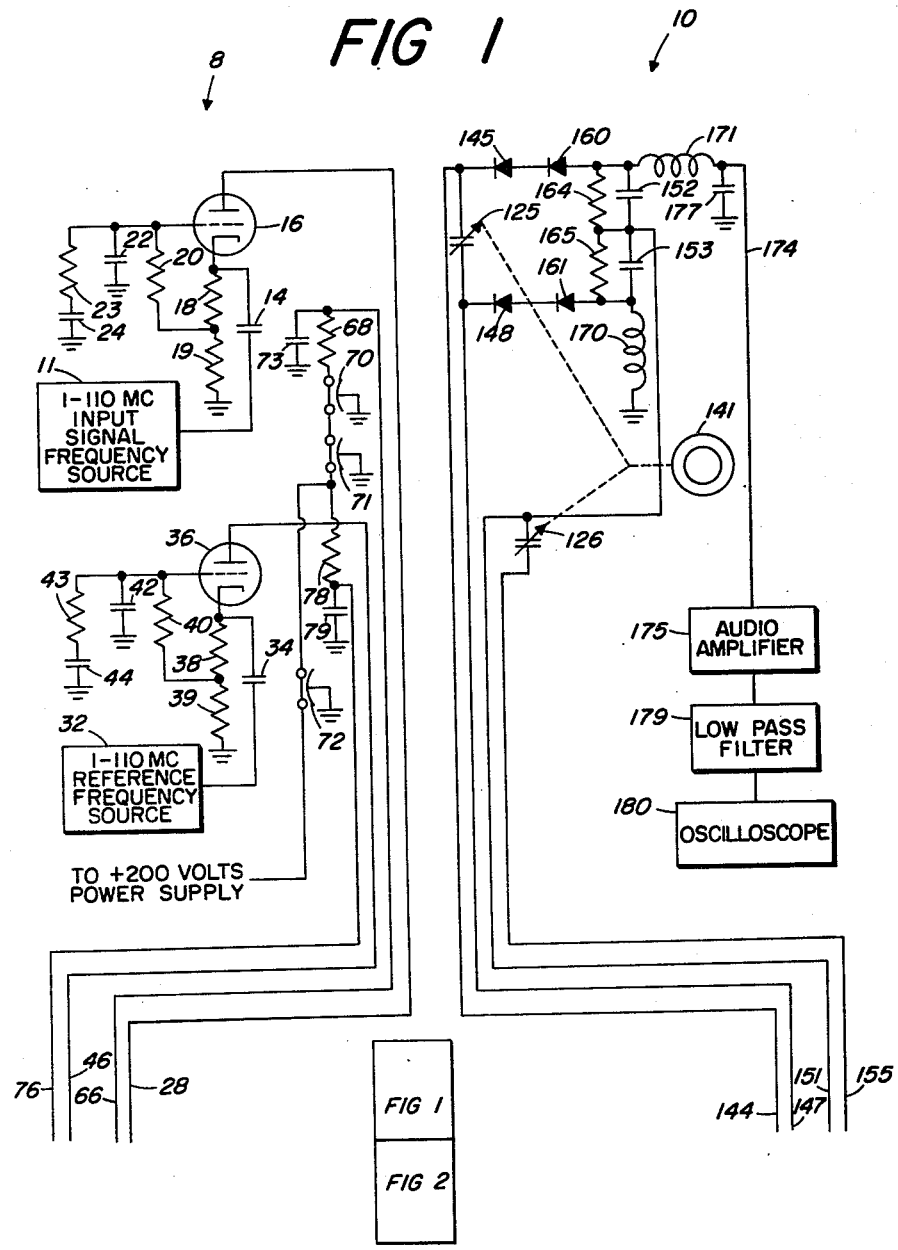
FIGURE 1 is a schematic diagram of a portion of the phase detector of this invention.

Referring now to the drawings in which like numerals have been used for like characters throughout, the numeral 8 indicates generally the received signal and reference signal input section of the phase detector of this invention, while the numerals 9 and 10 indicate generally the tuned circuit section and detection-readout sections, respectively.

As shown and described hereinafter, the phase detector of this invention is designed to cover a broad frequency range from 1 megacycle to 110 megacycles and handle voltage inputs on the order of 50 volts. It is to be appreciated, however, that this covered range and voltage handling capacity is arbitrarily chosen and could be expanded or contracted, as would be evident to one skilled in the art, without departing from the intended scope of this invention.

In the specific embodiment of this invention about to be described, the phase detector of this invention is utilized as a part of test equipment wherein the reference frequency is first adjusted to the received input signal frequency, and then the received input signal source subjected to various tests during which time the phase detector produces an output signal indicative of phase deviation of the received input signal with respect to the reference signal. One such test, for example, is to vibrate the crystal of a crystal oscillator (serving as the received input signal source) to determine the phase deviation characteristics of the crystal in this environment.

It should be appreciated, however, that the phase detector of this invention is not meant to be limited to the specific embodiment about to be described since it could be used, for example, equally well in an automatic frequency control system to stabilize the frequency of operation at any point within the range of frequencies covered by the phase detector.

As shown in FIGURE 1, the received input signal, received from input signal frequency source 11, is coupled through coupling capacitor 14 to the cathode of conventional amplifier tube 16. The cathode of amplifier 16 is connected to ground through series connected resistors 18 and 19, to the junction of which resistors the grid is connected through resistor 20. In addition, the grid of amplifier 16 is connected with ground through capacitor 22 and series connected resistor 23 and capacitor 24. The plate of amplifier 16 is connected by means of lead 28 to the rotor of multiposition switch 30 in band selection section 9.

In like manner, the reference frequency from reference frequency source 32 is coupled through coupling capacitor 34 to the cathode of conventional amplifier 36. The cathode of amplifier 36 is connected to ground through series connected resistors 38 and 39, the junction of which resistors are connected to the grid of amplifier 36 through resistor 40. In addition, the grid of amplifier 36 is also connected with ground through a capacitor 42 and through series connected resistor 43 and capacitor 44. The plate of amplifier 36 is connected by means of lead 46 to the rotor of multiposition switch 48 in band selection section 9.

Multiposition switches 30 and 48 are connected to the input side of band selection section 9, along with multiposition switches 50 and 52. At the output side of band selection section 9, five multiposition switches 54, 56, 58, 60 and 62 are utilized for purposes to be brought out more fully hereinafter.

Since seven frequency bands have been utilized to cover the frequency range chosen, each multiposition switch must have at least seven stationary contacts, or pins. As shown herein each has eight pins, for convenience, and it is to be appreciated that the number of pins may vary as the number of bands varies to fit a particular need.

All of the multiposition switches are constrained to common rotation, and all may be mounted on a single shaft (not shown) as is common in the art. All of the multiposition switches are shown in the lowest frequency band position in FIGURE 2 with the rotors of all switches shown in contact with stationary contacts 1.

Figure 2:
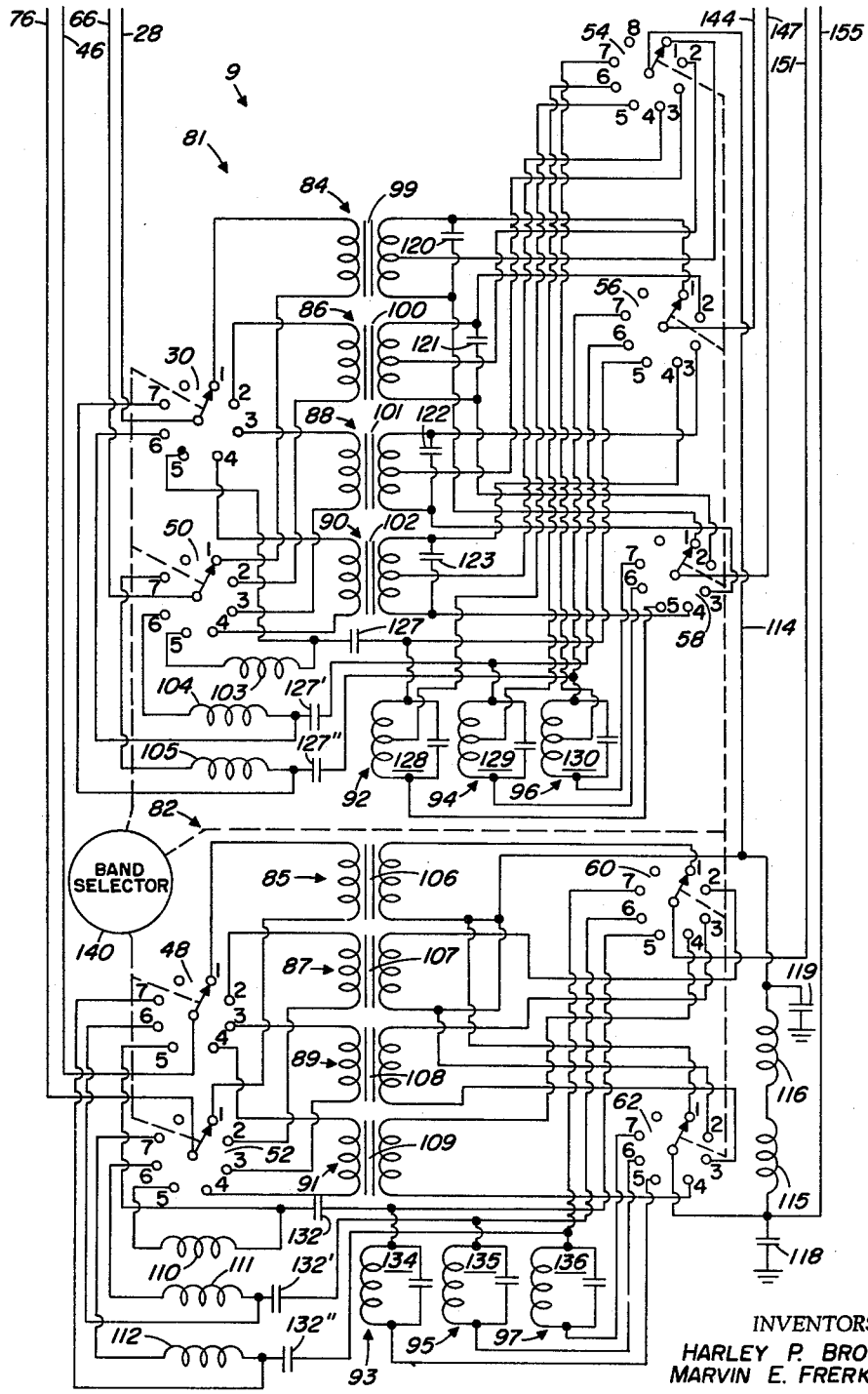
FIGURE 2 is a schematic diagram of another portion of the phase detector of this invention.

As shown in FIGURE 2, the rotor of multiposition switch 50 is connected by means of lead 66, resistor 68 and feedthrough capacitors 70, 71 and 72 to a +200 volt power supply (not shown). In addition, the junction of lead 66 and resistor 68 has a bypass capacitor 73 to ground.

In like manner, the rotor of multiposition switch 52 is connected by means of lead 76, resistor 78 and feedthrough capacitor 72 to the +200 volt power supply. The junction of lead 76 and resistor 78 also has a bypass capacitor 79 to ground.

The stationary contacts of multiposition switches 30, 48, 50 and 52 are connected to tuned circuits in band selection section 9, switches 30 and 50 being connected to the received signal tuned circuits 81 (shown at top of FIGURE 2), while switches 48 and 52 are connected to the reference signal tuned circuits 82 (shown at bottom of FIGURE 2). As shown, seven such tuned circuits covering the frequency range from 1 megacycle to 110 megacycles are utilized in each set of tuned circuits. The circuits identified by numerals covering the frequency bands are as follows:

| Band | Circuit Numeral Identification | | Frequency Range Covered, mc. |
|---|---|---|---|
| | Tuned Circuits 81 | Tuned Circuits 82 | |
| 1 | 84 | 85 | 1–2.5 |
| 2 | 86 | 87 | 2.5–6 |
| 3 | 88 | 89 | 6–15 |
| 4 | 90 | 91 | 15–35 |
| 5 | 92 | 93 | 35–60 |
| 6 | 94 | 95 | 60–85 |
| 7 | 96 | 97 | 85–110 |

As shown in FIGURE 2, stationary contacts 1 through 7 of switch 30 are connected to one side of tuned circuits 81, while the stationary contacts of switch 50 are connected to the other side. In like manner, the stationary contacts of switch 48 are connected to one side of tuned circuits 82, while the stationary contacts of switch 52 are connected to the other side.

As shown in FIGURE 2, switches 30 and 50 have pin 1 connected to the primary of transformer 99, pin 2 connected to the primary of transformer 100, pin 3 connected to the primary of transformer 101, pin 4 connected to the primary of transformer 102 and pins 5, 6 and 7 connected to opposite sides of inductors 103, 104 and 105, respectively.

Switches 48 and 52 are connected to tuned circuits 82 in like manner, pin 1 being connected to the primary of transformer 106, pin 2 being connected to the primary of transformer 107, pin 3 being connected to the primary of transformer 108, pin 4 being connected to the primary of transformer 109, and pins 5, 6 and 7 being connected to opposite sides of inductors 110, 111 and 112, respectively.

The secondary of transformer 99 is tapped, as are the secondaries of transformers 100, 101 and 102. The taps are connected to pins 1, 2, 3 and 4, respectively, of multiposition switch 54. The rotor of switch 54 is connected by means of lead 114 to one side of the secondaries of transformers 106 and 107, and to the rotor of multiposition switch 62 (through serially connected inductors 115 and 116).

To eliminate the stray R-F path between the input signal transformers (99–102 and 106–109), a pair of capacitors 118 and 119 (47 picofarad) to ground are connected at opposite sides of series connected inductors 115 and 116. This corrects for unbalance caused by coupling of power from the received signal transformers to the reference signal transformers as can become a problem above about 6 megacycles. The inductors are necessary to maintain the D.C. and A-F paths.

The secondaries of transformers 99, 100, 101 and 102 have connected in parallel therewith capacitors 120, 121, 122 and 123, respectively. In addition, a variable tuning capacitor 125 (see FIGURE 1) is connected in parallel with the secondaries of transformers 99, 100, 101 and 102 while the secondaries of transformers 106, 107, 108 and 109 are connected in parallel with variable tuning capacitor 126 (see FIGURE 1).

At frequencies above about 35 megacycles, it was found that the coefficient of coupling between the primary and secondary could not be made large enough to obtain a sufficiently high voltage for good resolution at the output from the detector. It also was found that the resonant frequency of the primary windings influenced the tuning of the transformer secondaries sufficiently to upset tracking of the two circuits. This was then eliminated by use of shunt fed tank circuits, as shown in FIGURE 2, in positions 5, 6 and 7.

As brought out hereinabove, pins 5–7 of switches 30 and 50 are connected to opposite sides of inductors 103, 104, and 150, respectively, while pins 5–7 of switches 48 and 52 are connected to opposite sides of inductors 110, 111 and 112, respectively. Pins 5–7 of switch 30 are also connected through capacitors 127, 127′ and 127″, respectively, to one side of LC tank circuits 128, 129 and 130, respectively, which tank circuits, along with tuning capacitor 125, make up tuned circuits 92, 94 and 96, respectively. The inductors in LC tank circuits 128, 129 and 130 are tapped, as shown in FIGURE 2, and the taps are connected with pins 5, 6 and 7, respectively, of multiposition switch 54.

LC tank circuits 128, 129 and 130 each have one side connected to pins 5, 6 and 7 of multiposition switch 56, respectively, and the other side connected to pins 5, 6 and 7, respectively, of multiposition switch 58. In like manner, pins 5–7 of switch 48 are connected through capacitors 132, 132′ and 132″, respectively, to one side of LC tank circuits 134, 135 and 136, respectively, which tank circuits, along with tuning capacitor 126, make up tuned circuits 93, 95 and 97, respectively. LC tank circuits 134, 135 and 136 have one side connected to pins 5, 6 and 7, respectively of multiposition switch 60, and the other side connected to pins 5, 6 and 7, respectively, of multiposition switch 62.

Thus, to provide the capability of handling higher voltages (on the order of 50 volts output from amplifiers 16 and 36) for providing high resolution, and to cover the broad range of frequencies (1 to 110 megacycles) it is thus necessary to provide the plurality of tuned circuits as brought out hereinabove. The components of each tuned circuit are, of course, chosen for the frequence band to be covered. The bands are then switched by a band selector switch 140, which is usually located at the instrument panel of the equipment. In addition, a separate switch 141 is provided for tuning capacitors 125 and 126 to vary the tuning of the tank circuits.

The rotor of multiposition switch 56 is connected by means of lead 144 to the cathode of diode 145 in detection section 10, while the rotor of multiposition switch 58 is connected by means of lead 147 to the cathode of diode 148 in section 10. The rotor of multiposition switch 60 is connected by means of lead 151 to one side of capacitors 152 and 153 in detection section 10, while the rotor of multiposition switch 62 is connected by means of lead 155 to tuning capacitor 126, the other side of which is connected to capacitors 152 and 153. In addition, the rotor of switch 62 is connected to the rotor of switch 54 through inductors 115 and 116 for purposes as brought out hereinabove, and to ground through capacitor 118, the rotor of switch 54 being connected to ground through capacitor 119.

Detection section 10 is essentially a bridge type discriminator. The anodes of diodes 145 and 148 are connected to the cathodes of diodes 160 and 161, respectively. The anodes of diodes 160 and 161 are, in turn, connected to capacitors 152 and 153, which capacitors are connected in parallel with resistors 164 and 165, respectively.

To reduce the shunting effect on the reference transformer due to primary to secondary capacity of the tapped received signal input transformers, a pair of inductors 170 and 171 are provided at the output of the detection section. Inductor 170 is connected between the anode of diode 161 and ground, while inductor 171 is connected serially at the output taken through lead 174 to conventional audio amplifier 175. In addition, a capacitor 177 to ground is provided at one side of inductor 171.

As shown in FIGURE 1, audio amplifier 175 is utilized to amplify the output from the phase detector. The output from amplifier 175 is then coupled through conventional low pass filter 179 to a readout device, such as oscilloscope 180.

In operation, the phase detector operates essentially as a bridge type discriminator. When the diodes are biased to conduction, two current paths are established one of which includes capacitor 152, resistor 164 and diodes 145 and 160, while the other includes capacitor 153, resistor 165 and diodes 148 and 161. The voltage developed across one resistor is opposite in polarity to that of the voltage developed across the other resistor and the output from the detector has a polarity determined by the larger developed voltage and a magnitude that is the difference therebetween. This voltage can then easily be utilized to indicate phase deviation, as is well known in the art. A more complete discussion of a phase discriminator of this type is given in United States Patent No. 2,905,818.

In utilizing the phase detector of this invention as a test set to determine frequency deviations of an oscillator, for example, the crystal oscillator to be tested is initially connected to amplifier 16. A reference frequency is then supplied to amplifier 36. The band selection switch 140 is set to the proper band and the reference frequency is then adjusted until the oscilloscope 180 indicates that the reference frequency is exactly that of the received input signal. The crystal is then subjected to the desired tests, such as a vibration test, for example, and the deviation from the reference frequency is indicated on the oscilloscope.

It is a feature of this invention that the tuned circuits enable higher voltages to be handled by the phase detector over a broad range of frequencies, thus making it possible to achieve high resolution of phase deviation.

It is another feature of this invention that a broad range of frequencies can be covered. Thus, the same test set might be utilized for indicating frequency deviation at 10 megacycles, for example, and then immediately thereafter utilized to indicate frequency deviations at 100 megacycles merely by selecting a new band of frequencies that includes the new relevant frequency.

In view of the foregoing, it should be evident to those skilled in the art that the phase detector of this invention provides an improved phase detector that is not only capable of being tuned over a broad range of frequencies but, in addition, is capable of high resolution of phase deviation at any frequency within the covered range.

What is claimed as our invention is:

1. A broad band phase detector comprising:
    first input means for receiving a first input signal, said first input means including:
        a plurality of first tuned circuit means for selectively passing bands of frequencies which collectively form said broad range of frequencies;
        first selective means connected to said first tuned circuit means for selecting the band of frequencies that includes said first input signal;
    second input means for receiving a second input signal having a frequency within the selected band of frequencies;
    means for varying the frequency of one said input signal with respect to the frequency of the other said input signal;
    and means for receiving said input signals from said first and second input means and responsive to frequency differences therebetween to develop an output signal indicative thereof.

2. The phase detector of claim 1 wherein said tuned circuit means comprises a plurality of tank circuits each of which is tunable over a band that is a relatively small portion of said broad range of frequencies.

3. The phase detector of claim 1 wherein said second input means includes a plurality of second tuned circuit means for selectively passing bands of frequencies within said broad range of frequencies; and further characterized by second selective means connected to said second tuned circuit means for selecting the band of frequencies that includes said second input signal.

4. A broad band phase detector comprising:
    first input means for receiving a first input signal to be monitored;
    a plurality of tuned circuit means each of which covers a different band of frequencies within said broad range of frequencies and which collectively cover the entire broad range of frequencies;
    means for selectively connecting each of said tuned circuit means to said first input means;
    second input means for receiving a reference signal;
    means for varying the frequency of said reference signal;
    detecting means connected to receive said first input signal and said reference signal;
    said detecting means constructed to produce an output signal when said signals are of different frequencies;
    and means for receiving the output signal from said detecting means and indicating with high accuracy said frequency differences.

5. The phase detector of claim 4 further characterized by a second plurality of tuned circuit means each covering a portion of said broad range of frequencies and collectively covering the entire broad range of frequencies,
    and means for selectively connecting each of said second plurality of tuned circuit means to said second input means.

6. A phase detector capable of being tuned over a predetermined range of frequencies between 1 megacycle and 110 megacycles and providing good resolution over said covered range, said phase detector comprising:
    first input means for receiving a first input signal;
    a first multiposition switch, the movable contactor of which is constantly connected to said first input means;
    first tuned circuit means that includes a plurality of LC circuits each of which covers a different portion of said covered frequency range and which collectively cover the entire predetermined frequency range;
    means connecting each of said LC circuits to a different stationary contactor of said first multiposition switch;

second input means for receiving a reference signal;
a second multiposition switch, the movable contactor of which is constantly connected to said second input means;
second tuned means that includes a plurality of LC circuits each of which covers a different portion of said predetermined frequency range and which collectively cover the entire predetermined frequency range;
means connecting each of said LC circuits of said second tuned means to a different stationary contactor of said second multiposition switch;
means having first and second inputs and an output;
and means connecting said first and second plurality of LC circuits to said first and second inputs of said last named means so that the phase of a signal received at said first input means is compared with the phase of a reference signal received at said second input means whereby an output indicative of phase differences therebetween is produced.

References Cited by the Examiner

UNITED STATES PATENTS 2,490,499  12/49  Woodward _____ 328—134 X
2,521,789  9/50  Grosdoff _____ 328—134 X JOHN W. HUCKERT, *Primary Examiner.*
ARTHUR GAUSS, *Examiner.*